United States Patent [19]
Kopylov et al.

[11] Patent Number: 5,827,346
[45] Date of Patent: Oct. 27, 1998

[54] METHOD OF MAKING CORE HOLES IN CAST OPTICAL FIBER PREFORMS BY DRAWING A WIRE THERETHROUGH DURING SOLIDIFICATION

[75] Inventors: Nonna Kopylov, Scotch Plains; Ahmet R. Kortan, Warren, both of N.J.

[73] Assignee: Lucent Technologies Inc., Murray Hill, N.J.

[21] Appl. No.: 594,193

[22] Filed: Jan. 31, 1996

[51] Int. Cl.⁶ .................................................. C03B 37/017
[52] U.S. Cl. .............................. 65/384; 65/385; 65/388; 65/404; 65/DIG. 4; 65/68
[58] Field of Search .......................... 65/385, 388, 404, 65/DIG. 4, 384, 68, 83

[56] References Cited

U.S. PATENT DOCUMENTS

| | | | |
|---|---|---|---|
| 1,628,417 | 5/1927 | Miller | 65/68 |
| 3,587,956 | 6/1971 | Oelke | 65/DIG. 4 |
| 3,603,127 | 9/1971 | Nurnberg | 65/DIG. 4 |
| 3,762,903 | 10/1973 | Hamilton | 65/DIG. 4 |

*Primary Examiner*—John Hoffmann

[57] ABSTRACT

A method of making core holes in cast cladding glass for fabricating optical fiber preforms to make single and multimode optical fibers. Liquid cladding glass is pored into a casting mold having a metallic wire that is translated through the liquid glass as it cools so that the wire essentially carves out a smooth cylindrical core hole along the cylindrical axis of the cooled cladding glass. The method substantially reduces surface contamination at the interface of the core hole and the cladding glass because any liquid glass that comes in contacts with the metallic wire is removed during the process, leaving behind a pristine glass surface.

20 Claims, 2 Drawing Sheets

METHOD OF MAKING CORE HOLES IN CAST OPTICAL FIBER PREFORMS BY DRAWING A WIRE THERETHROUGH DURING SOLIDIFICATION

FIELD OF THE INVENTION

The present invention relates to fiber optics, and more particularly to a method and apparatus of fabricating small holes in cast cladding glasses for making single mode and multimode fiber preforms.

BACKGROUND OF THE INVENTION

Heretofore, many different types of glasses have been used to form optical fibers. Basically, optical fibers utilize glass materials to confine light as it travels through the fiber so that the light does not escape or pass out of the fiber. Rather, the glass reflects any light trying to escape back inside so that no power or information is lost during a fiber optic transmission. As a result, optical fibers that maintain total internal reflection for the entire length of the fiber are very desirable for optical communications.

The manufacture of optical fiber is a precise and highly demanding process requiring special equipment. Generally, the first step in making glass fibers is to make a rod or "preform" of highly purified glass, with a core and a cladding structure. The preform is then heated and drawn out into a thin fiber, which is coated with a protective plastic layer as it is drawn. Preparation of a preform having a desired set of properties (i.e. no bubbles or crystallites) often becomes very difficult and sometimes impossible.

The structure of an optical fiber preform consists of a cylindrical core glass imbedded coaxially in the center of a cladding glass cylinder. A common method of fabricating such preforms is to drill a hole in the center of a cylindrical cladding glass and insert a core glass rod therein. When drilling the cylindrical hole, however, the inner surface of the cladding glass can become highly damaged and contaminated. This damage is not removable by any means for many types of cladding glass including heavy metal fluoride glasses. The best solution is to provide some chemical and mechanical polishing of the drilled hole to smooth out the damage therein. For ZBLAN (a glass made from a mixture of Zirconium, Barium, Lanthanum, Aluminum, Sodium and Fluorine), there are no known methods for chemical and mechanical polishing that will produce a pristine surface on the inner surface of the cladding glass.

Although other methods of fabricating preforms have been developed, they do not provide holes that are small enough for certain applications. For example, rotational casting or built-in casting methods are not capable of producing small enough holes for single-mode optical fiber preforms.

SUMMARY OF THE INVENTION

Accordingly, the present invention is directed to an apparatus and method for making core holes in cast optical fiber preforms that are less susceptible to contamination and damage, and suitable for both single and multimode optical fiber preforms.

To attain this, the present invention utilizes a two-stage casting mold to provide separate temperature control over the cooling of liquid cladding glass deposited therein so that a metallic wire can be translated through cooling liquid glass as it solidifies. Any liquid glass that comes in contact with the wire binds thereto and is removed during the process, leaving behind a pristine glass surface surrounding the core hole.

As a result, the core hole produced by this method is intrinsically very clean and the glass surface forming the core hole is uncontaminated. Moreover, the diameter of the hole can be adjusted by changing the wire diameter, allowing one to fabricate preform cladding tubes with core hole diameters suitable for single or multimode optical fiber preforms. Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE INVENTION

Figure 1:
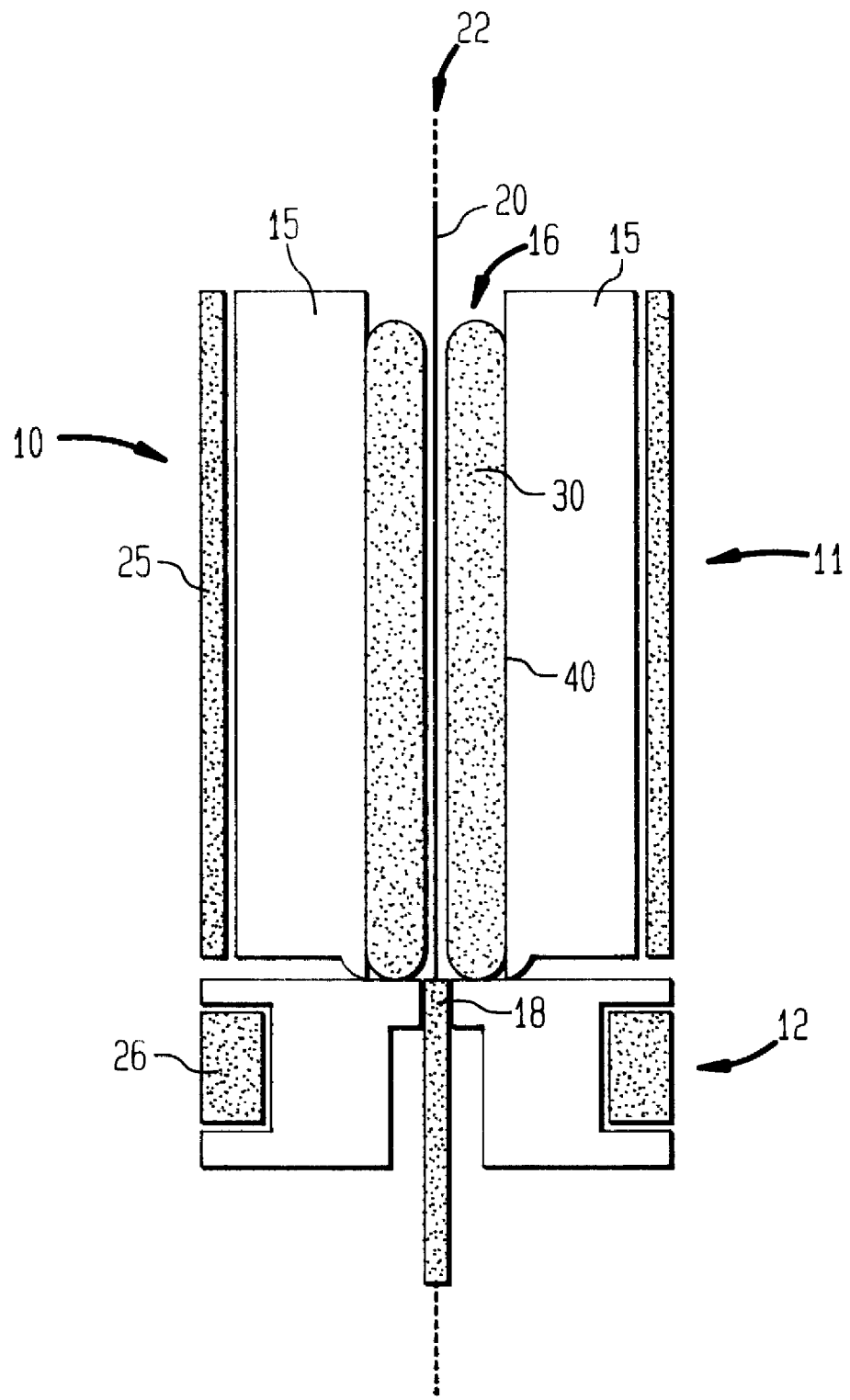
FIG. 1 shows a cross sectional view of the platinum wire that translates along the cylindrical axis of the mold according to the method of the present invention.

Referring to FIG. 1, there is shown a crossectional view of one embodiment of a two stage casting mold utilized in performing the inventive method of the present invention. As shown, two stage mold 10 has a top piece 11 and a bottom piece 12. Top piece 11 has a brass mold wall 15 that forms a cylindrical cavity 16 in which the preform is molded. Bottom piece 12 has a center hole 18 which communicates with cavity 16 such that wire 20 can be translated through cavity 16 and center hole 18 along cylindrical axis 22.

Two stage mold 10 incorporates a method of separate temperature control over top piece 11 and bottom piece 12. As shown, heater 25 provides temperature control over top piece 11, whereas heater 26 provides temperature control over bottom piece 12. One embodiment of the present inventive method, utilizing two stage mold 10, is described below.

Initially, top piece 11 is set to a temperature substantially near the glass transition temperature of glass 30 in order to anneal the cast glass and relieve the strain from cooling or solidifying the liquid glass 30. The bottom piece is set to a temperature slightly above the softening temperature of glass 30. A platinum wire 20, which can also be set to a predetermined temperature and separately temperature controlled, is held stationary along cylindrical axis 22 of cavity 16. The liquid cladding glass 30 is then cast into mold 10 and quenched into a glassy state. This quenching process takes place first at the surface where glass comes in contact with the mold, and solidifies. The solidification proceeds towards cylindrical axis 22 as heat is extracted from the liquid glass 30 through mold wall 15.

After waiting a predetermined time period following the casting, and just before the center part of the cast glass solidifies, platinum wire 20 is translated vertically in an upward or downward motion along the cylindrical axis 22 of cavity 16. Since bottom piece 12 is held above the softening temperature of glass 30, the glass in the region along the cylindrical axis 22 remains soft and does not restrict the motion of the wire.

As platinum wire 20 is moved through this region, wire 20 carries along a thin coating of solidified glass along with it. The wire is continuously translated at a slow speed until all the glass 30 is solidified. The wire is then removed, and a core hole 40 is thus produced in glass 30. Since the liquid glass 30 that comes in contact with wire 20 is thus removed, core hole 40 is intrinsically very clean and the surface of glass 30 in hole 40 is uncontaminated.

Figure 2:
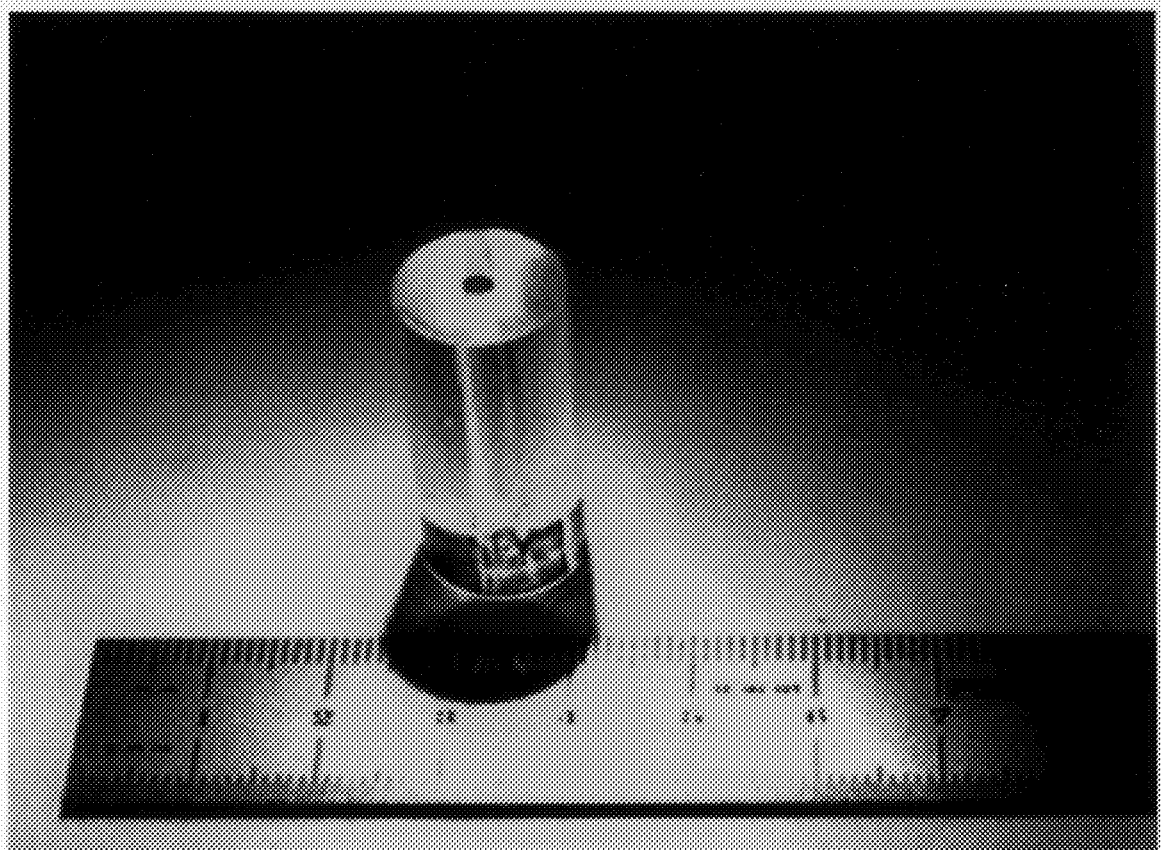
FIG. 2 shows a pictorial view of the preform prepared according to the inventive method illustrated in FIG. 1.

In addition, the diameter of hole 40 can be adjusted by changing the diameter of wire 20, thus allowing one to fabricate preform cladding tubes with core hole diameters suitable for single and multimode optical fiber preforms. The preforms can be made from a predetermined type of glass, including ZBLAN. A pictorial view of a cast preform having a core hole made according to the method of the present invention is shown in FIG. 2.

Subsequent to the described steps, further steps toward completion of an optical fiber preform are generally carried out, typically followed by drawing of fiber from the preform. These steps can be conventional as can be fiber drawing.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of making optical fiber, the method comprising making a core hole in cast cladding glass for fabricating an optical fiber preform comprising the steps of:
   a. positioning a metallic wire in a casting mold having a cylindrical cavity with a central cylindrical axis pointing in a vertical direction, said metallic wire having a predetermined diameter, said wire positioned in said cylindrical cavity along said center cylindrical axis;
   b. heating a cladding glass to liquefy said glass;
   c. pouring said liquid cladding glass into said cylindrical cavity of said casting mold;
   d. vertically translating said metallic wire through cylindrical cavity along said cylindrical axis of said casting mold;
   e. applying a temperature gradient across said casting mold to quench said liquid cladding glass so that said liquid first solidifies at points in contact with said casting mold and then progressively toward said cylindrical axis of said cylindrical cavity over a predetermined period of time;
   f. continuously translating said metallic wire as set forth in step (d) until said liquid cladding glass completely solidifies;
   g. removing said metallic wire from said solidified cladding glass to form the core hole therein; and
   h. making said solidified glass into the optical fiber preform, and drawing optical fiber therefrom.

2. The method of claim 1 wherein said metallic wire is platinum.

3. The method of claim 1 wherein said casting mold is a two-stage casting mold having a top part and a bottom part which are independently temperature controlled, wherein said top part defines said cylindrical cavity, and wherein said bottom part has a center hole which communicates with said cylindrical cavity in said top part.

4. The method of claim 3 wherein in step (a), said metallic wire extends from said cylindrical cavity through said center hole in said bottom part.

5. The method of claim 3 wherein said top part, prior to step (c) is set to a temperature substantially near a transition temperature of said cladding glass in order to anneal said glass and relieve strain during said solidifying.

6. The method of claim 5 wherein said bottom part is set to a temperature slightly above the softening temperature of said cladding glass.

7. The method of claim 1 wherein said diameter of said wire is selected for formation of a core hole for a multimode optical fiber.

8. The method of claim 1 wherein said diameter of said wire is selected for formation of a core hole for a single mode optical fiber preform.

9. The method of claim 1 wherein said cladding glass is a heavy metal fluoride glass.

10. The method of claim 9 wherein said glass is a ZBLAN glass.

11. The method of claim 1 wherein said metallic wire is independently temperature controlled.

12. The method of claim 11 wherein said wire is set to a predetermined temperature.

13. A method of making a core hole in cast cladding glass for fabricating an optical fiber preform, the method comprising the steps of:
   a. positioning a metallic wire in a casting mold having a cylindrical cavity with a central cylindrical axis pointing in a vertical direction, said metallic wire having a predetermined diameter, said wire positioned in said cylindrical cavity along said center cylindrical axis;
   b. heating a cladding glass to liquefy said glass;
   c. pouring said liquid cladding glass into said cylindrical cavity of said casting mold;
   d. vertically translating said metallic wire through cylindrical cavity along said cylindrical axis of said casting mold;
   e. applying a temperature gradient across said casting mold to quench said liquid cladding glass so that said liquid first solidifies at points in contact with said casting mold and then progressively toward said cylindrical axis of said cylindrical cavity over a predetermined period of time;
   f. continuously translating said metallic wire as set forth in step (d) until said liquid cladding glass completely solidifies; and
   g. removing said metallic wire from said solidified cladding glass to form the core hole for the optical fiber preform.

14. The method of claim 13 wherein said casting mold is a two-stage casting mold having a top part and a bottom part which are independently temperature controlled, wherein said top part defines said cylindrical cavity and wherein said bottom part has a center hole which communicates with said cylindrical cavity in said top part.

15. The method of claim 14, wherein in step a., said metallic wire extends from said cylindrical cavity through said center hole in said bottom part.

16. The method of claim 14 wherein said top part, prior to step c., is set to a temperature substantially near a transition temperature of said cladding glass in order to anneal said glass and relieve strain during said solidifying.

17. The method of claim 16 wherein said bottom part is set to a temperature slightly above the softening temperature of said cladding glass.

18. The method of claim 13 wherein said diameter of said wire is selected for formation of a core hole for a multimode optical fiber.

19. The method of claim 13 wherein said diameter of said wire is selected for formation of a core hole for a single mode optical fiber preform.

20. The method of claim 13 wherein said metallic wire is independently temperature controlled.

\* \* \* \* \*